April 12, 1966  J. F. DILLON, JR  3,245,314
OPTICAL ROTATION DEVICES EMPLOYING A FERROMAGNETIC
CHROMIUM TRIHALIDE
Filed June 28, 1962  2 Sheets-Sheet 1
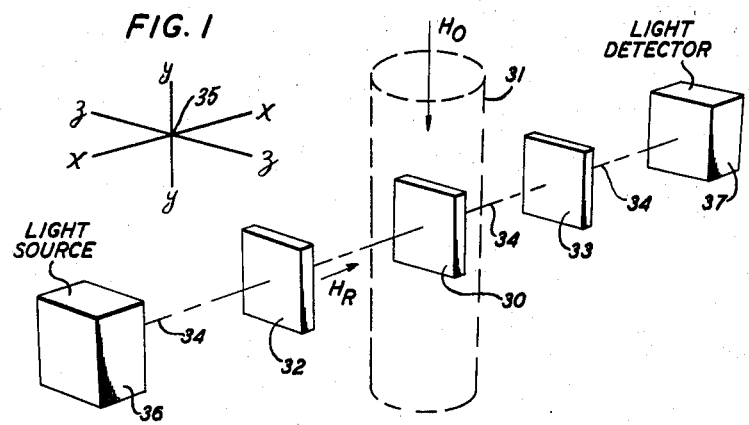
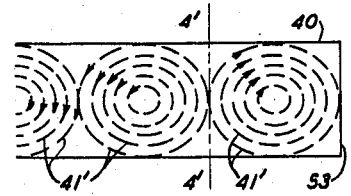
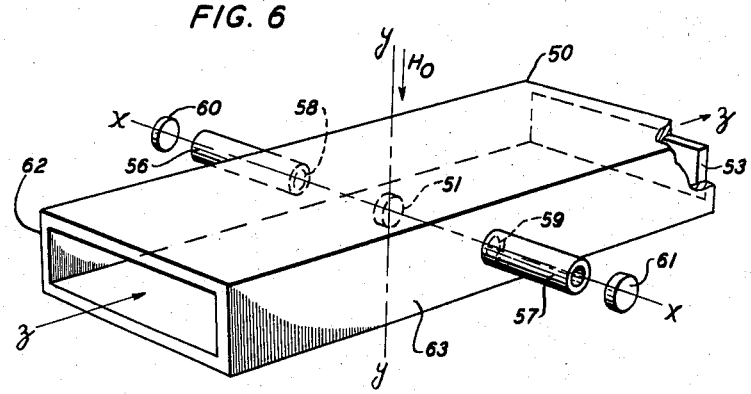
INVENTOR
J. F. DILLON, JR.
BY
ATTORNEY April 12, 1966   J. F. DILLON, JR   3,245,314
OPTICAL ROTATION DEVICES EMPLOYING A FERROMAGNETIC
CHROMIUM TRIHALIDE
Filed June 28, 1962   2 Sheets-Sheet 2
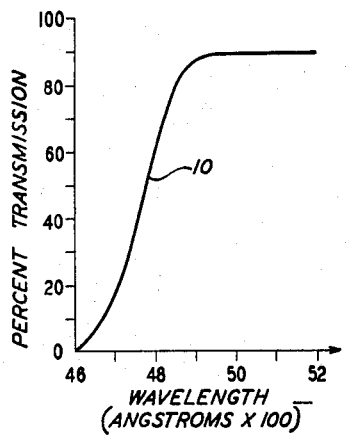
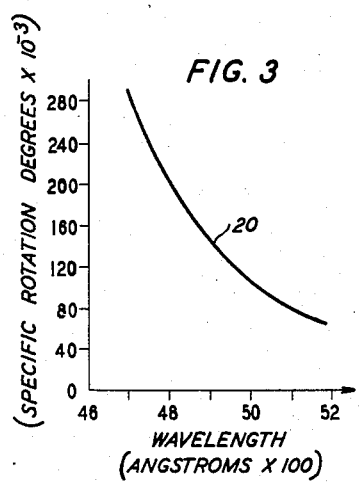
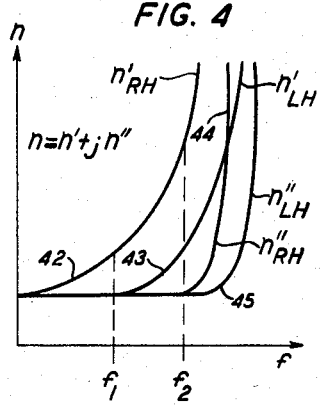
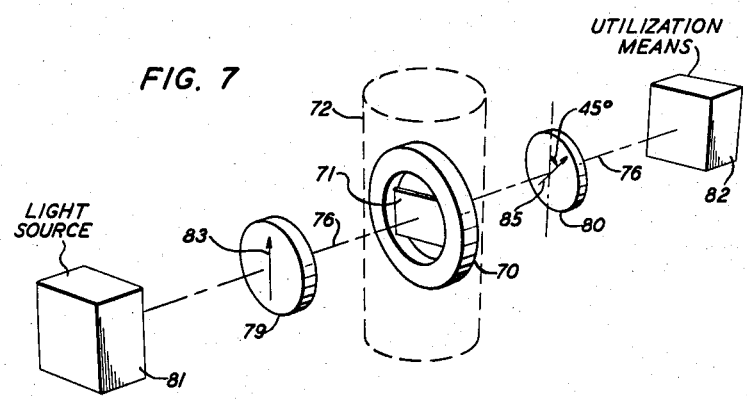
INVENTOR
J. F. DILLON, JR.
BY
Kenneth W. Mateer
ATTORNEY

United States Patent Office

3,245,314
Patented Apr. 12, 1966

---

3,245,314
OPTICAL ROTATION DEVICES EMPLOYING A FERROMAGNETIC CHROMIUM TRIHALIDE
Joseph F. Dillon, Jr., Morris Township, Morris County, N.J., assignor to Bell Telephone Laboratories, Incorporated, New York, N.Y., a corporation of New York
Filed June 28, 1962, Ser. No. 206,102
11 Claims. (Cl. 88—61)

This invention relates to optical frequency devices utilizing electromagnetic wave energy transparent materials in the ferromagnetic state to produce magnetic rotation of the Faraday rotation type and, more particularly, relates to devices utilizing transparent chromium tribromide in the ferromagnetic state or one of the other chromium trihalides, also in the ferromagnetic state, which exhibit a layered crystal structure.

In general the relative magnitudes of the coefficient of specific rotation (degrees of rotation per centimeter of rotating material traversed) for the Faraday effect in a group of substances are utlimately proportionately dependent upon the fraction of electrons in the substances which can be spin-aligned. Materials in which the spin system is ordered so that all the spins are parallel, i.e., ferromagnetic materials, will exhibit greater Faraday rotations than will materials without an ordered spin system. In devices utilizing the Faraday effect, therefore, it is desirable to employ media exhibiting large net magnetic moments as the transmitting and rotating media.

Most magnetic materials, however, have optical absorptions so large that they are not significantly transparent to electromagnetic wave energy of optical frequencies. When such magnetic materials are prepared in sections thin enough to transmit significant portions of incident light in the optical frequency range including the infra-red, visible, and the ultraviolet regions, the path length in the material is so short that, despite the high specific rotations of such materials, the amount of observable Faraday rotation is small. Conversely, for nonmagnetic materials which are transparent to light in and beyond the visible region of the spectrum, the specific rotations are so low that material path lengths which are undesirably long for certain applications are necessary to produce significant amounts of rotation.

It has been recently discovered, however, that certain ionic crystals, forming a group of ordinarily paramagnetic materials, when disposed within an environment in which the ambient temperature does not exceed the temperature for the appearance of a spontaneous magnetization, known as the Curie point for a given material, exhibit pronounced ferromagnetism and, in the presence of an applied external magnetic field, a substantial net magnetic moment. In accordance with the present invention, it has been found that these crystals are significantly transparent to wavelengths within the optical frequency range.

Specifically the group consists of those chromium (III) halides having a layered crystal structure in which the chromium ions form hexagonal nets which are covalently bonded between two layers of halogen ions. Chromium trifluoride, characterized by a crystal structure differing from that described above, exhibits magnetic coupling which is antiferromagnetic and, therefore, falls outside the group. In this connection, however, it is intended that materials which exhibit metamagnetic coupling be included in the scope of the term ferromagnetic. It has been found that the trivalent chromium compounds of chlorine, bromine, and iodine, in the ferromagnetic state, not only exhibit substantial Faraday rotation but in accordance with the invention are transparent to frequencies in the optical wavelength range.

It is, therefore, an object of the present invention to effect substantial observable Faraday rotation of the plane of polarization of visible light.

In Table I below, the specific rotation of chromium tribromide, representative of the aforementioned group of ferromagnetic halides, is compared with the specific rotations associated with several representative materials, including the best priorly known material, yttrium-iron garnet. A magnetic field intensity of 10,000 gauss applied parallel to the direction of light propagation through the material has been assumed. The specific rotation for the first five substances is proportional to the strength of the applied field whereas rotation does not increase appreciably for the last two substances above the values given for a magnetically saturated condition.

*Table I*

| Material: | Specific rotation in degrees per centimeter |
|---|---|
| Calcium fluoride (fluorite) | 1.5 |
| Carbon (diamond) | 2.1 |
| Sodium chloride (rock salt) | 6.0 |
| Jena glass (very heavy flint) | 14.8 |
| Stannous chloride | 37.5 |
| Yttrium-iron garnet (5400 A.) | 2,000 |
| Chromium tribromide (4800 A.) | 200,000 |

The ferromagnetic chromium halides can be prepared in sections transparent to light in the infra-red and to light of shorter wavelengths. Chromium tribromide in the ferromagnetic state for example, exhibits low absorption loss in the green between 4775 A. and 5300 A., in the red between 6000 A. and 6800 A., as well as in the infra-red.

In accordance with the present invention it has been discovered that the materials of the chromium trihalide group produce substantial Faraday rotation within a frequency region in which light waves are transmitted thereby with low loss. Chromium tribromide for example, exhibits high rotation and low absorption simultaneously in the green. Light of longer wavelengths will show decreased rotation and, in certain frequency bands, high absorption.

If visible monchromatic light is passed through an unmagnetized crystal of chromium tribromide and then viewed on a screen, it will be seen that the domain structure of the crystal has introduced a diffraction effect. Such a diffraction is, for the purposes of the invention, undesirable. By applying an external orienting steady magnetic field to a chromium tribromide crystal of strength sufficient to saturate the crystal magnetically, the diffraction can be eliminated and magnetic atoms thereof can be aligned to form a single domain whose direction is fixed by the orienting field. By orienting the entire crystal with its magnetization perpendicular to the direction of propagation of an incident linearly polarized light beam, the crystal may be made to pass the beam without rotation. By orienting the entire crystal so that the magnetization is parallel or antiparallel to the incident light beam, rotation of the entire beam in one rotational sense or the other may be accomplished. By orienting the crystal so that its magnetization has a component in the direction of the incident polarized wave, a rotation less than the maximum possible rotation is realized. When linearly polarized visible light which has passed through a chromium tribromide crystal subjected to an orineting field of varying direction is viewed with an analyzing prism oriented perpendicular to the polarizing prism, the viewed field will be uniform in intensity over the field, but its intensity will vary between complete transmission and complete extinction. This effect is the result of the variation of the magnitude of the component of the magnetization of the crystal measured along the direction of propagation.

A variety of devices can be constructed to bring about and to utilize this phenomenon. Devices utilizing the Faraday rotation effect, which has heretofore been used in the microwave transmission arts to construct devices such as magnetic shutters, isolators, gyrators, circulators, and modulators, can now be easily realized in frequency ranges higher than the microwave range. Because of the large specific rotations shown by ferromagnetic chromium tribromide and the other ferromagnetic chromium trihalides, inordinately long path lengths through the materials are not required. Accordingly, Faraday rotation modulation devices as well as optical frequency isolators characterized by very short path lengths are now more readily available.

In particular, the phenomenon of ferromagnetic resonance in chromium tribromide can be utilized in combination with a microwave signal to produce microwave modulation of an optical frequency beam of electromagnetic wave energy. Heretofore, operative microwave light modulators utilizing the Faraday effect have been difficult to realize due to the relatively low specific rotations of the available materials. With the chromium trihalides, however, characterized by specific rotations nearly two orders of magnitude greater than the best priorly known materials, light modulators at microwave frequencies can be more readily realized.

It is, therefore, a further object of the present invention to effect light modulation at microwave frequencies.

The above and other objects of the invention, as well as its various features and advantages, will become more readily apparent from reference to the accompanying drawing and detailed description thereof which follows.

In the drawing:

FIG. 1 is a schematic view of a Faraday rotation device in accordance with the present invention;

FIG. 2 is a graphical plot of absorption versus frequency for chromium tribromide in the ferromagnetic state;

FIG. 3 is a graphical plot of specific rotation versus frequency for the chromium tribromide of FIG. 1;

FIG. 4 is a theroretical graphical plot illustrating the basis of the rotation properties of the ferromagnetic chromium trihalides;

FIGS. 5A and 5B are illustrations of the standing wave magnetic field pattern at times separated by one-half period within a shorted wave guide section supporting the $TE_{10}$ wave mode;

FIG. 6 is a perspective view of a light modulator in accordance with the invention; and FIG. 7 is a perspective view of an optical isolator in accordance with the invention.

Referring more particularly to the drawing, FIG. 1 illustrates a light rotation system in which the rotating medium 30 is a thin single crystal slab of a chromium trihalide from the group consisting of chromium trichloride, chromium tribromide, or chromium triiodide. Monocrystalline material is preferred and is intended in the embodiments herein disclosed. However, in less critical applications polycrystalline material can be used if dispersion within the material is sufficiently low to preserve the necessary transparency. Slab 30 is disposed within a low temperature medium, shown in FIG. 1 in dashed outline as cryostat 31. The temperature within cryostat 31 is below the Curie point, the temperature for which crystal 30 becomes ferromagnetic. For chromium tribromide, for example, the Curie point is 37° K. Advantageously, cryostat 31 can contain liquid helium held at a temperature below its lambda point of 2.1° K. to prevent bubbling.

Operating characteristics of a representative chromium trihalide crystal in accordance with the invention are illustrated in FIGS. 2, 3 and 4, which are graphical representations of the transmission, rotation, and physical properties of chromium tribromide.

In FIG. 2, the transmission of light incident upon a chromium tribromide crystal which is 5 microns thick along the transmission direction is plotted in percent along the ordinate as a function of the wavelength, plotted in Angstroms along the abscissa. If "cut-off" is arbitrarily defined for the 5 micron sample as that point at which the transmission exceeds 50%, curve 10 indicates a cut-off at 4775 Angstroms. For purposes of the plot of FIG. 2, transmission of unpolarized light has been observed for a crystal immersed in liquid helium at 1.5° K.

In FIG. 3, the specific rotation in degrees per centimeter observed for a chromium tribromide crystal has been plotted along the ordinate, again as a function of wavelength of incident light in Angstroms along the abscissa. In the ferromagnetic state it can be seen from curve 20 that, for wavelengths above the cut-off wavelength of 4775 A. in FIG. 2, rotations per centimeter crystal thickness between 80,000 degrees and 200,000 degrees are possible. Such rotations are comparable to those reported for iron metal. However, in the case of iron, the percent transmission is so low that the maximum observable rotation is approximately 9 degrees, as reported in an article by Von H. König which appeared in "Optik," 1948, at page 101. With chromium tribromide and the other ferromagnetic chromium trihalides, rotations up to and exceeding 2,000 degrees can be observed. Such large rotations permit more facile practical realization of optical rotation and modulation devices which were heretofore only possible with considerable difficulty.

Returning now to the rotator of FIG. 1, the plane faces of crystal 30 are shown to be perpendicular to an axis designated $x$ in a co-ordinate system 35, and lying in the plane of orthogonal axes $y$, $z$, which are mutually orthogonal to the $x$ axis. Polarizing prism 32 and analyzing prism 33 are mounted, one on each side of crystal 30, along the $x$ axis. Prism 32 is aligned to transmit light having a plane of polarization parallel to the $xy$ plane while analyzing prism 33 is aligned to transmit light having a plane of polarization parallel to the $xz$ plane. Thus polarizing prism 32 and analyzing prism 33 are disposed at a 90 degree angle relative to each other. In practice, prisms 32, 33 can be the well-known crossed Glan-Thompson prisms, for example.

As illustrated in FIG. 1, a magnetic field $H_O$, of strength sufficient to saturate crystal 30 is applied thereto along and parallel to the $y$ axis. In the absence of a saturating field, diffraction of the incident light by the domain structure of the crystal occurs. In the presence of solely such a saturating field, however, the magnetization M associated with crystal 30 is aligned in the direction of the field and no diffraction occurs. Since the field $H_O$ and the resultant magnetization vector associated with crystal 30 lie in a plane orthogonal to the direction of travel of light beam 34 emerging from light source 36 and propagating along the $x$ axis through crystal 30 toward light detector 37, the crystal would have no rotational effect upon the light beam. Accordingly, analyzing prism 33 would stop the beam when said prism is oriented at 90 degrees to polarizing prism 32 as discussed above, and no energy would be received at the detector.

However, by the application of a second magnetic field, designated $H_R$ in FIG. 3, in a direction parallel to the direction of travel of light beam 34 along the $x$ axis, crystal 30 can be caused to exhibit a magnetization having a component in the direction of travel of light beam 34. Therefore, a rotation of the polarization plane of the light beam results on passing through the trihalide crystal. In order for analyzing prism 33 to extinguish completely the rotated beam of light, the prism must be itself rotated to a new position. Although in FIG. 3 the orienting steady magnetic field $H_O$ has been depicted as lying parallel to the $y$ axis, it is to be understood that the direction of this field can be along any line in the $yz$ plane. Any such orientation will fail to produce a magnetization component parallel or antiparallel to the direction of propagation of light beam 34. Similarly the direction of magnetic field $H_R$ can be any direction lying outside the $yz$ plane since any magnetic field sufficiently strong to affect the magnetization of crystal 30, other than a field in the $yz$ plane, produces a magnetization component parallel or antiparallel to the direction of propagation of light beam 34 and will cause some rotation thereof. When the field $H_R$ is directed to produce a component antiparallel to the direction of propagation of beam 34 the rotation will be opposite in sense from but equal in magnitude to that produced by a field having a component parallel to the direction of propagation.

It can further be seen that the relative magnitudes of magnetic fields $H_O$ and $H_R$ can be independently varied. If the strength of the field $H_O$ is decreased to zero and the strength of the field $H_R$ raised to a value sufficient to saturate crystal 30 magnetically, then the magnetization of crystal 30 can be aligned parallel to the direction of propagation of the incident light beam, thereby producing maximum rotation thereof for a given crystal thickness. Additionally since $H_O$ and $H_R$ can be considered as component portions of a single magnetic field, there need be no more than a single magnetic field applied to crystal 30 to accomplish any of the results described above. Such a single field can be varied in direction and magnitude continuously or intermittently with any desired practical frequency to effect changes in the magnetization of crystal 30 and therefore the rotation produced thereby.

The orientation of crystal 30 with respect to $x$, $y$, and $z$ axes need not be that particular one depicted in FIG. 1. That is, the body can be spatially oriented to lie in any convenient plane. The length of the light path through a rotating crystal such as crystal 30 in FIG. 3 will vary with the orientation thereof relative to the light beam, of course, but the crystal itself can be magnetized to have a magnetization component parallel or antiparallel to the direction of propagation of the light beam, or to have no such component, regardless of its orientation with respect to the beam.

The basis of the Faraday rotation produced by the structure of FIG. 1 can be perhaps more readily understood by reference to FIG. 4. In FIG. 4, the index of refraction associated with a ferromagnetic chromium tribromide crystal is plotted along the ordinate as a function of frequency plotted along the abscissa. Mathematically, the index of refraction is represented by the sum of a real part $n'$ an imaginary part $n''$. Physically, the real part corresponds to a propagation constant and the imaginary part corresponds to an absorption constant. As seen in FIG. 4 the index of refraction for light energy incident upon chromium tribromide is dependent upon the sense of circular polarization of the light. To an observer looking in the propagation direction along the light propagation path a clockwise rotating vector has been defined as a right hand (RH) polarization while a counterclockwise rotating vector has been defined as a left hand (LH) polarization. Thus, in FIG. 4 curve 42 represents the wave velocity for the right hand polarization and curve 43 represents the wave velocity for the left hand polarization. Similarly, curves 44 and 45 represent the loss or absorption associated with the right hand and left hand polarizations, respectively. The extremely sharp absorption edge, represented by curves 44, 45, together with the more gently increasing propagation constant curves 42, 43, permit operation of a chromium tribromide crystal in a region simultaneously characterized by (1) low loss for both polarization senses and (2) differing wave velocities for the polarization senses. Since a linearly polarized light vector can be considered the resultant of two oppositely rotating vectors, and since the wave velocities associated with the oppositely rotating light vectors are different, a linearly polarized wave of frequency between $f_1$ and $f_2$, incident upon a chromium tribromide crystal, will experience a resultant rotation of the polarization plane. By operating in a frequency region below $f_2$, thereby remaining outside the absorption band, rotation without substantial absorption can be effected in accordance with the present invention.

In addition to their Faraday rotation producing properties the ferromagnetic chromium trihalides are capable of operation in a ferromagnetic resonance state. Ferromagnetic resonance is a phenomenon which has been widely explored in the microwave transmission art. Certain magnetic materials such as the low temperature chromium trihalides here disclosed, and more commonly that class of materials known as ferrites, show strong absorption of certain radio frequency microwaves when the materials are subjected to an orienting magnetic field applied perpendicular to the direction of the radio frequency magnetic field of the microwaves incident thereupon. Maximum absorption, or resonance, occurs at that microwave frequency which corresponds to a natural frequency of precession of the magnetization vector of the material around its equilibrium orientation which results from the application of the orienting field. The phenomenon of resonance and the conditions under which it is produced are disclosed for example in "The Behavior and Applications of Ferrites in the Microwave Region" by Fox, Miller & Weiss, Bell System Technical Journal, vol. 34 (January 1955) pages 5–103. The phenomenon described in the Fox et al. article with respect to ferrites is analogous to the phenomenon in the ferromagnetic chromium trihalides disclosed herein.

The chomium trihalides which are characterized by a layered structure and which exhibit a net magnetic moment under the influence of an applied magnetic field, are thus unique not only because they are ferromagnetic materials which can transmit and rotate electromagnetic waves in the optical frequency range including the infrared, visible, and ultra-violet regions with significantly higher specific rotations than do other substances transparent in the same regions of the spectrum, but also because such materials are suitable for radio frequency control of significant and observable modulation by means of the phenomenon of ferromagnetic resonance. FIGS. 5A, 5B and 6 disclose a preferred means for effecting such high frequency modulation of a light beam.

FIG. 5A is a plan view of a shorted wave guide section 40 supporting a standing wave pattern in the dominant $TE_{10}$ mode. The dashed lines 41 represent the magnetic field loops associated with the resonant mode at the beginning of a given wave cycle. It is apparent that in the transverse plane crossing the guide section at a point one-half wavelength from end wall 53 and represented by line 4—4, the magnetic fields associated with each half wave of the standing wave are similarly directed from the upper boundary in FIG. 5A toward the lower boundary and therefore reinforce in such direction.

FIG. 5B is a plan view of the shorted section 40 of FIG. 5A taken one-half period later in time. As seen in the figure, the magnetic field loops, represented by dashed lines 41', have reversed in sense. In the transverse half wavelength plane along 4'—4' the direction of the transverse magnetic field portions has changed by 180 degrees from their directions one-half wave period earlier as shown in FIG. 5A. Such a reversal in the direction of the field in the transverse half wavelength plane will occur twice in each wave period, at a frequency twice the frequency of the microwave energy. This rapidly oscillating field can be used as the $H_R$ of FIG. 1 to cause precession of the magnetization in a chromium tribromide single crystal at resonance, and thus to provide a rapidly oscillating component of the magnetization along the direction of propagation of a light beam traversing the crystal, thereby producing rapidly oscillating amounts of Faraday rotation.

FIG. 6 is a perspective view of a light modulation device in which a microwave radio frequency field is used to produce modulation by using the Faraday rotation phenomenon described above. In FIG. 6 conductively bounded shorted wave guide section 50 is positioned with its long dimension along the z axis. Disposed within section 50 and extending transverse to the x axis is an element 51 comprising monocrystalline chromium tribromide. Element 51 is illustrated as a circular disc but this particular shape is not intended to be limiting. Shorted wave guide section 50 comprises a wave guide 52 which is closed at one end by conductive plate 53, and which is proportioned to support the dominant $TE_{10}$ mode. Tubular guiding means 56, 57 are positioned along the x axis and are mounted on narrow side walls 62, 63 respectively of section 50, having an interior connection therewith through apertures 58, 59. These apertures are positioned one-half wavelength from shorting plate 53 along side walls 62, 63. Guiding means 56, 57 are dimensioned to be below cut-off for microwave energy within section 50, thereby precluding microwave power leakage therefrom. Polarizing means 60 and analyzing means 61 are positioned along the x axis externally of guiding means 56, 57. An orienting direct current magnetic field, designated by arrow $H_O$ is applied to crystal 51, thereby producing a magnetization in the yz plane. As shown in FIG. 6, the orienting field is applied along the y axis but it is to be understood that any direction in the yz plane is permissible.

In the operation of the modulation device of FIG. 6, traveling electromagnetic waves are incident through wave guide 52 upon shorting plate 53 and cause a standing wave mode pattern to be established in section 50. As shown above in FIGS. 5A and 5B the standing waves within section 50 produce an oscillating radio frequency magnetic field in the transverse half wavelength plane, taken as the xy plane in FIG. 6. Since crystal 51 is mounted within section 50 with its broad faces normal to the xy plane, the oscillating microwave magnetic field is properly oriented to produce a component of magnetization normal to the broad faces of the crystal and along the x axis. In general a microwave magnetic field would have little effect on the resultant magnetization of the chromium tribromide crystal 51. However, if the frequency of the microwave energy and the strength of the applied orienting magnetic field $H_O$ are chosen to produce a resonance condition in the crystal 51, significant orientation of the magnetization of the crystal can be produced due to the effect of the microwaves in inducing precession of the magnetization about the orienting field axis. As set out hereinabove, crystal 51 must be maintained at a temperature below its Curie point in order for the ferromagnetic state to be realizable. In this connection therefore it is advantageous that the structure of FIG. 6 or at least that portion thereof including crystal 51 be operated in a cryostat. The use of superconducting magnets to produce the orienting field is advantageous in this application, and the miniaturization realized by such use in especially attractive in view of the low temperature requirement.

In the operation of the device of FIG. 6 as a light modulator, a beam of light is projected along the x axis through polarizing prism 60, guiding means 56, and aperture 58, into guide section 50, through crystal 51 and thence outward through aperture 59, guiding means 57, and through analyzing means 61. Upon its traversal of resonantly biased crystal 51, rotation of the plane of polarization of the light beam will be effected, the amount thereof depending upon the magnitude of the impressed microwave magnetic field, and the sense thereof depending upon the instantaneous transverse direction of the rapidly changing direction of that microwave field. Since the plane of polarization of light emerging from crystal 51 varies, the intensity of the light beam which is transmitted by analyzing means 61 likewise varies. This variation is observable at the output of analyzing means 61 as a variation in intensity, or amplitude modulation, of the transmitted light beam.

While the modulation system of FIG. 6 was illustrated within a shorted wave guide section it is to be understood that a conductively bounded wave guide cavity could alternately be used.

Single crystals of chromium tribromide have been prepared by heating powdered chromium in a stream of bromine vapor to about 750 degrees. Upon cooling, the chromium tribromide crystals appeared in the form of plates which could be sliced to the desired thickness. For purposes of the present invention, crystals having thickness in the range between 3 and 50 microns are suitably transparent for use as rotation and modulation means. Microwave resonance at 23,240 megacycles has been observed in a rectangular flake of chromium tribromide 0.9 millimeter on a side and 18 microns thick, subjected to an orienting magnetic field of 10,250 oersteds. A flake of chromium tribromide of such thickness shows a maximum rotation of about 15 degrees per micron in the green at about 4850 Angstroms, corresponding with a specific rotation in the green of greater than 150,000 degrees per centimeter as noted in Table I above. Thus in the modulator of FIG. 6 a crystal 120 microns thick would produce a Faraday rotation of approximately 1800 degrees. To realize a rotation of 45 degrees with such a sample would require that only 1/20 of the resultant magnetization projected along the axis of light beam travel. This requires that the precessing magnetization should fan out to a cone angle of 1.4 degrees. Precession cone angles of this order occur before the onset of spin wave instability and thus such devices can be realized in practice with the ferromagnetic chromium trihalides at resonance.

In FIG. 7, a ferromagnetic chromium trihalide crystal is utilized as the rotation element in an optical frequency isolator. Specifically, crystal 71 is disposed within a Dewar flask 72 which is held below the Curie point of the material of crystal 71. Superconducting magnet 70 is also disposed within the low temperature Dewar and surrounds crystal 71. Magnet 70 comprises a material which is superconducting at low temperatures such as, for example an alloy of niobium and zirconium. The magnet is placed within the Dewar before the temperature therewithin is reduced below the superconducting transition temperature of the magnet material which, for niobium zirconium is 12° K. An external magnetic field is applied as the temperature of the magnet is reduced below 12° K. When this occurs, the alloy becomes superconducting and the magnetic flux which passes through the center of the magnet is "frozen in." The external magnet can then be removed and the magnetic field will remain. In embodiments of the present invention, a field stregnth in the region of 3500 to 4000 oersteds is sufficient to saturate crystal 71. Polarizing prism 79 and analyzing prism 80 are positioned on light path 76 one each on opposite sides of Dewar 72. Prisms 79, 80 are disposed at an angle of 45 degrees with respect to each other. A light source 81 is aligned with crystal 71. Light source 81 can comprise a mercury lamp emitting green light, an optical maser operating in the green, or a polychromatic source followed by a filter system transmitting only green light.

In operation, monochromatic light, linearly polarized in a direction indicated by arrow 83, is incident upon crystal 71, which is magnetically saturated by the field associated with magnet 70. Upon passage through crystal 71, the plane of polarization is rotated by an amount determined by the orientation of the magnetic field, the thickness of crystal 71 and the wavelength of the incident light to be 45 degrees. Thus rotated, the light passes through analyzing prism 80, which is aligned in a direction indicated by arrow 85 to coincide with a 45 degree rotation, to utilizing means 82, which can be a detector or further optical circuitry. Any light reflected back toward source 81 from any point beyond crystal 71 is additionally rotated 45 degrees in the same direction as originally experienced on the first traversal of the crystal. Upon reaching prism 79 therefore, the polarization of the reflected light beam and that of prism 79 are related by 90 degrees. Thus prism 79 acts as a complete extinguisher of such light, and none of the reflected light reaches the light source. Such isolation is desirable in a light communication system in which the level of reflected signal at the source is desired to be kept low.

One specific application in which an optical frequency isolator is particularly advantageous involves an optical maser in which high amplification is desired. It has been found that maser amplifiers which provide the required theoretical amplification are susceptible to oscillation. By inserting optical isolators in accordance with the present invention periodically along the amplification path, oscillations can be suppressed and at the same time, the path length over which amplification occurs is not appreciably lengthened. In applications in which operation in a cryostat is required, the superconducting magnet-chromium trihalide rotator is extremely attractive due to its small space requirement.

In all embodiments of the invention in which the chromium compounds of chlorine, bromine and iodine have been specified, it should be understood that in addition to rotation media in which only a single one of such compounds is used, it is possible to employ atomic mixture of the several trihalide materials. Furthermore, one of the other paramagnetic metal ions can be substituted for a small percentage of the chromium ions as a trace impurity to vary slightly one or more of the physical parameters of the rotation medium.

In all cases it is understood that the above described arrangements are illustrative only of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A light rotation device comprising a transmitting and rotating medium of material selected from the group consisting of the chromium trihalides which are ferromagnetic below their Curie point and which exhibit a net magnetic moment in the presence of an applied magnetic biasing field,
   means for applying linearly polarized light waves to said medium,
   means for analyzing said waves after traversing said medium,
   means for maintaining the temperature of said medium below its Curie point,
   and means for magnetically saturating said medium, said last mentioned means being adapted to provide a finite nonzero magnetic field component parallel to the direction of travel of said waves.

2. The device of claim 1 in which said medium is chromium tribromide.

3. In combination,
   a light transmitting and rotating medium of material selected from the group consisting of the ferromagnetic chromium trihalides characterized by a layered atomic tsructure in which layers of chromium atoms are sandwiched between layers of halogen atoms, the temperature of said medium being below its Curie point,
   means for illuminating said medium with linearly polarized light,
   means for receiving and analyzing said light after transmission through said medium,
   and magnetic means arranged to impress a saturating magnetic biasing field upon said medium,
   said field including a first component directed along the propagation direction and a second component directed substantially normal to said propagation direction.

4. The combination according to claim 3 including means for varying the itnensity of at least one of said magnetic field components to vary the amount of rotation of the polarization plane of said transmitted light.

5. The combination according to claim 3 in which said first magnetic field varies at a frequency in the microwave frequency range.

6. A light modulator comprising the combination of a light transmitting and rotating medium selected from the group consisting of chromium trichloride, chromium tribromide, and chromium triiodide,
   means for maintaining the temperature of said medium below its Curie point,
   a source of linearly polarized light waves adapted to illuminate said medium,
   means for analyzing and detecting the light transmitted through said medium,
   and magnetic means for magnetically saturating said medium,
   said magnetic means adapted to provide a first field component directed along the propagation direction of said polarized light and a second field component lying in a plane normal to said first component,
   said first field component being of variable intensity.

7. The modulator according to claim 6 in which the strength of said second field is selected to be of a strength causing said medium to be ferroresonant at the frequency of said first field component.

8. A microwave frequency light modulator comprising a wave guide section conductively bounded at one longitudinal end,
   a single crystal of a material selected from the group consisting of the chromium (III) compounds of chlorine, bromine, and iodine disposed within said section,
   means for maintaining said crystal at a temperature below its Curie point,
   means for applying linearly polarized light to said crystal,
   means for receiving the light transmitted through said crystal,
   means for biasing said crystal to be resonant at a given frequency,
   and means for applying microwave energy of said resonant frequency to said section to provide a varying microwave magnetic field along the transmission direction of said light through said crystal.

9. The modulator according to claim 8 in which said crystal comprises chromium tribromide.

10. An isolator for electromagnetic wave energy in the optical frequency range comprising,
    a light transmitting and rotating medium selected from the group consisting of chromium trichloride, chromium tribromide, and chromium triiodide,
    means for maintaining the temperature of said medium below its Curie point,
    means for illuminating said medium with light waves linearly polarized in a given direction,
    polarizing means positioned on the light wave path between said illuminating means and said medium,
    said polarizing means being oriented to transmit substantially completely waves of said given polarization direction,
    analyzing means positioned along the path of said waves beyond said medium,
    said analyzing means being oriented to transmit substantially completely waves of a polarization rotated 45 degrees from said given polarization direction,
    and means for magnetically saturating said medium,
    the thickness of said medium along the light path, the strength of the magnetic field component along the light path, and the wavelength of said light waves being selected to effect a 45 degree rotation of the plane of polarization of said waves into the plane of substantially complete transmission of said analyzing means.

11. An isolator for electromagnetic wave energy in the optical frequency range comprising,
a light transmitting and rotating medium selected from the group consisting of chromium trichloride, chromium tribromide, and chromium triiodide,
means for maintaining the temperature of said medium below its Curie point,
means for illuminating said medium with light waves linearly polarized in a given direction,
polarizing means positioned on the light wave path between said illuminating means and said medium,
said polarizing means being oriented to transmit substantially completely waves of said given polarization direction,
analyzing means positioned along the path of said waves beyond said medium,
said analyzing means being oriented to transmit substantially completely waves of a polarization rotated 45 degrees from said given polarization direction,
and means comprising a superconducting magnet for magnetically saturating said medium, the thickness of said medium along the light path, the strength of the magnetic field component along the light path, and the wavelength of said light waves being selected to effect a 45 degree rotation of the plane of polarization of said waves into the plane of substantially complete transmission of said analyzing means.

References Cited by the Examiner

UNITED STATES PATENTS 2,974,568   3/1961   Dillon _____ 88—61

OTHER REFERENCES

Hansen, "Some Magnetic Properties of the Chromium (III) Halides at 4.2° K.," Journal of Applied Physics, supplement to vol. 30, No. 4, April 1959.

Porter et al.: "Transparent Ferromagnetic Light Modulator Using Yttrium Iron Garnet," Journal of Applied Physics, vol. 29, No. 3, March 1958, pp. 495, 496.

JEWELL H. PEDERSEN, *Primary Examiner.*

R. L. WIBERT, *Assistant Examiner.*